(12) United States Patent
Ji et al.

(10) Patent No.: US 9,454,191 B2
(45) Date of Patent: Sep. 27, 2016

(54) ATCA BACKPLANE

(71) Applicant: ZTE Corporation, Shenzhen, Guangdong (CN)

(72) Inventors: Hao Ji, Shenzhen (CN); Shan Zhao, Shenzhen (CN); Bin Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/394,778

(22) PCT Filed: Apr. 17, 2013

(86) PCT No.: PCT/CN2013/074326
§ 371 (c)(1),
(2) Date: Oct. 16, 2014

(87) PCT Pub. No.: WO2013/170681
PCT Pub. Date: Nov. 21, 2013

(65) Prior Publication Data
US 2015/0049422 A1 Feb. 19, 2015

(30) Foreign Application Priority Data
May 14, 2012 (CN) .......................... 2012 1 0148536

(51) Int. Cl.
*H05K 1/14* (2006.01)
*G06F 1/18* (2006.01)
*H04L 12/64* (2006.01)
*H04L 12/66* (2006.01)

(52) U.S. Cl.
CPC ........... *G06F 1/186* (2013.01); *H04L 12/6418* (2013.01); *H04L 12/66* (2013.01); *H04Q 2213/13003* (2013.01); *H04Q 2213/13076* (2013.01)

(58) Field of Classification Search
USPC ................ 361/736, 727, 807, 809, 788, 810
See application file for complete search history.

(56) References Cited

U.S. PATENT DOCUMENTS 4,179,172 A * 12/1979 Godsey ................ H05K 7/1439
361/785
4,361,637 A * 11/1982 Stofko, Jr. ........... C07D 209/80
430/58.3

(Continued)

FOREIGN PATENT DOCUMENTS

CN 1901530 A 1/2007
CN 101052136 A 10/2007

(Continued)

OTHER PUBLICATIONS

Supplementary European Search Report in European application No. 13791669.8, mailed on Apr. 14, 2015.

(Continued)

*Primary Examiner* — Hung S Bui
(74) *Attorney, Agent, or Firm* — Oppedahl Patent Law Firm LLC

(57) ABSTRACT

The ATCA backplane of the present invention comprises a front backplane and a rear backplane. The front backplane and the rear backplane are interconnected through a connector; each backplane at least comprises slots of a node board, and each rear backplane at least comprises slots of a node board. Furthermore, slots of a switch board could be arranged on at least one backplane of the ATCA backplane. Therefore, it is guaranteed by the ATCA backplane of the present invention that node boards could be inserted into both the front backplane and the rear backplane included in the ATCA backplane. Therefore, the number of slots of node boards is increased, slot resources are extended and system processing capability is improved.

10 Claims, 3 Drawing Sheets

(56) References Cited

U.S. PATENT DOCUMENTS

| | | | | |
|---|---|---|---|---|
| 5,335,146 | A * | 8/1994 | Stucke | H05K 7/1445 174/260 |
| 5,991,312 | A * | 11/1999 | Koenig | H04J 3/14 370/216 |
| 7,458,815 | B2 | 12/2008 | Fallah-Adl | |
| 7,780,455 | B2 * | 8/2010 | Leigh | H05K 7/1441 439/61 |
| 8,599,564 | B2 * | 12/2013 | Lin | G06F 1/184 361/729 |
| 2003/0007339 | A1 * | 1/2003 | Harris | G02B 6/43 361/788 |
| 2003/0075984 | A1 * | 4/2003 | Ho | G06F 1/189 307/43 |
| 2007/0038732 | A1 | 2/2007 | Chandwani | |
| 2007/0083690 | A1 * | 4/2007 | Koga | H05K 7/1457 710/301 |
| 2011/0228779 | A1 | 9/2011 | Goergen | |
| 2013/0329392 | A1 * | 12/2013 | Czuba | H05K 7/1445 361/784 |
| 2014/0307375 | A1 * | 10/2014 | Mann | G06F 1/20 361/679.02 |

FOREIGN PATENT DOCUMENTS

| | | |
|---|---|---|
| CN | 201426156 Y | 3/2010 |
| CN | 102036124 A | 4/2011 |
| CN | 102043447 A | 5/2011 |
| CN | 102710423 A | 10/2012 |
| CN | 202872807 U | 4/2013 |
| JP | 200031668 A | 1/2000 |
| JP | 2000151156 A | 5/2000 |
| JP | 2006179820 A | 7/2006 |
| JP | 2008541299 A | 11/2008 |
| JP | 2009542053 A | 11/2009 |
| KR | 20070061197 A | 6/2007 |
| WO | 2010105350 A1 | 9/2010 |

OTHER PUBLICATIONS

International Search Report in international application No. PCT/CN2013/074326, mailed on Jul. 18, 2013.
English Translation of the Written Opinion of the International Search Authority in international application No. PCT/CN2013/074326, mailed on Jul. 18, 2013.

* cited by examiner

ATCA BACKPLANE

TECHNICAL FIELD

The disclosure relates to computer technology, and in particular to an ATCA (Advanced Telecom Computing Architecture) backplane.

BACKGROUND

With development of a telecom service, a telecom operator focuses more on flexibility, openness, scalability and service stability of telecom platform. therefore, ATCA plays an important role in a next-generation telecom network.

FIG. 1 is a diagram of board distribution of a typical ATCA 14-slot shelf. Boards in the shelf are divided into front boards and rear boards. A front board may be a HUB BOARD or a NODE BOARD. A rear board is inserted opposite a front board as an interface expansion unit of the front board, and provides an external interface.

An interface connecting a front board to a backplane is defined in area 1 or area 2 by function. An interface, such as a power supply interface or a system management interface, is defined in area 1. A data transmission channel is defined in area 2. FIG. 2 is a schematic diagram of a typical connection between a front board and a rear board. An interface connecting a front board to a rear board is defined in area 3. A front board is connected directly to a rear board via corresponding plugging pieces, without the need of interconnection by a backplane.

At present, a front board is mainly for service processing. Due to a limited size, a rear board can serve only as an expansion to an interface of a front board and provide some simple interfaces such as a keyboard, mouse, or display interface, but can hardly provide strong service processing capability, thus leading to waste of slot resources on the rear board.

SUMMARY

In view of this, it is desired that embodiments of the disclosure provide an ATCA backplane, capable of expanding slot resources.

To this end, a technical solution of the disclosure is implemented as follows.

An Advanced Telecom Computing Architecture ATCA backplane, includes at least one backplane pair of a front backplane and a rear backplane interconnected via a connector, each backplane in the at least one backplane pair containing slots for at least one node board.

In an embodiment, a backplane in the at least one backplane pair may extend to an area 3 on a board to which the backplane is connected, and may be arranged with a plug connected to a slot for the area 3 on the board.

In an embodiment, a slot for an area 3 on a node board connected to a backplane in the at least one backplane pair may be connected to one or more specially designed slots of the front backplane or the rear backplane via backplane wiring.

In an embodiment, a node board connected to the front backplane may be of a type same as or different from a type of a node board connected to the rear backplane.

In an embodiment, board connecting slots of the front backplane may be arranged symmetric or asymmetric to board connecting slots of the rear backplane.

In an embodiment, the connector may include one or more connectors; when there are multiple connectors, the multiple connectors may be of one or more types.

In an embodiment, at least one backplane in the ATCA backplane may contain a slot for a hub board.

In an embodiment, the slot for the hub board may include slots for at least two hub boards.

In an embodiment, the hub board may include at least two hub boards arranged on a same backplane, or arranged respectively on two different backplanes, and the at least two hub boards may back up each other.

In an embodiment, a slot for an area 3 on a hub board connected to a backplane in the at least one backplane pair may be connected to one or more specially designed slots of the front backplane or the rear backplane via backplane wiring.

The ATCA backplane herein includes at least a front backplane and a rear backplane interconnected via a connector. Each backplane in the ATCA backplane contains slots for at least one node board. In addition, at least one backplane in the ATCA backplane is arranged with a slot for a hub board. Therefore, a node board may be inserted in either a front backplane or a rear backplane in the ATCA backplane herein, increasing a number of node board slots, expanding slot resources, and enhancing system processing capability.

DETAILED DESCRIPTION

Embodiments of the disclosure provide an ATCA backplane containing a backplane-pair structure to increase a number of available node board slots of an ATCA system and enhance processing capability of the ATCA system.

The ATCA backplane includes at least one backplane pair of a front backplane and a rear backplane interconnected via a connector. At least one backplane in the ATCA backplane contains a slot for a hub board. Each backplane in the at least one backplane pair contains slots for at least one node board.

In general, the slot for the hub board in the ATCA backplane includes slots for at least two hub boards.

Moreover, a front board and a rear board in the ATCA backplane are no longer inserted into each other directly; and a rear board in the ATCA backplane is not like one defined in a PICMG3.0 specification either. A backplane in the ATCA backplane extends to an area 3 on a (front or rear) board to which the backplane is connected, and is provided with a plug connected to a slot for the area 3 on the board.

In addition, a slot for an area 3 on a hub board or a node board connected to a backplane in the ATCA backplane is connected, via backplane wiring, to one or more slots of the front backplane or the rear backplane, the slots being specifically designed for providing an external or internal interface of a shelf.

In an embodiment, architecture of interconnection of a front backplane and a rear backplane based on the PICMG3.0 specification may be used, abandoning original requirement of configuration of a rear board for each front board, such that a board inserted to either a front backplane or a rear backplane may be a node board or a hub board.

Figure 1:
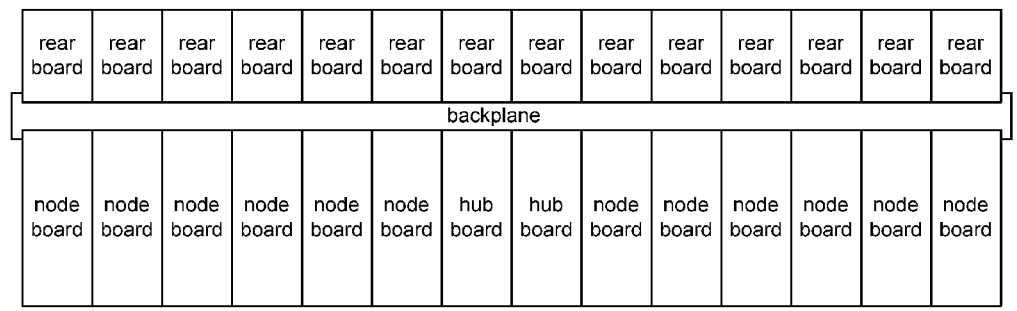
FIG. 1 is a diagram of board distribution of a typical 14-slot shelf.
Figure 2:
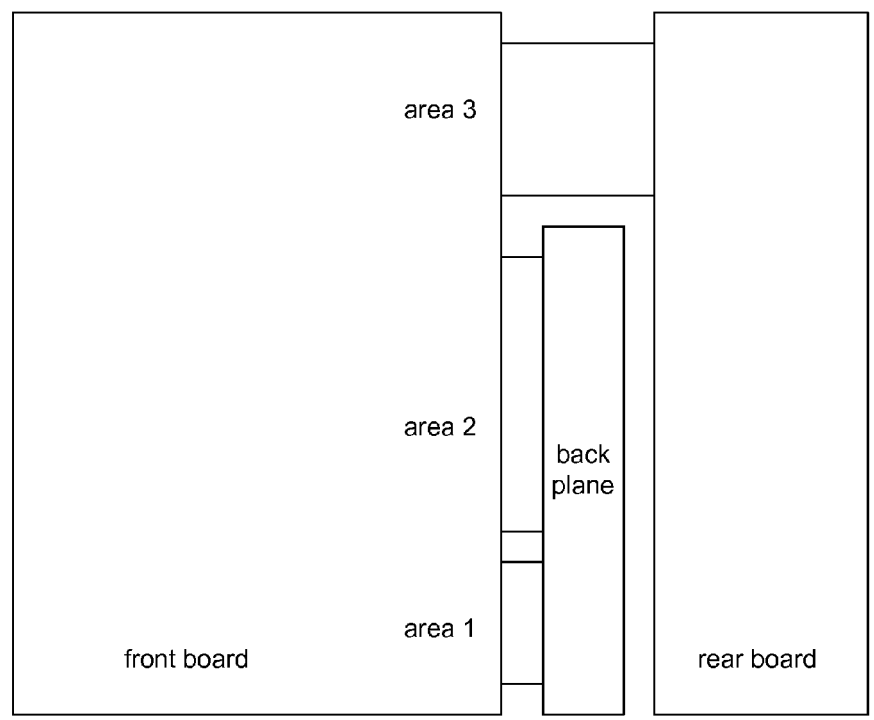
FIG. 2 is a schematic diagram of a typical connection between a front board and a rear board.
Figure 3:
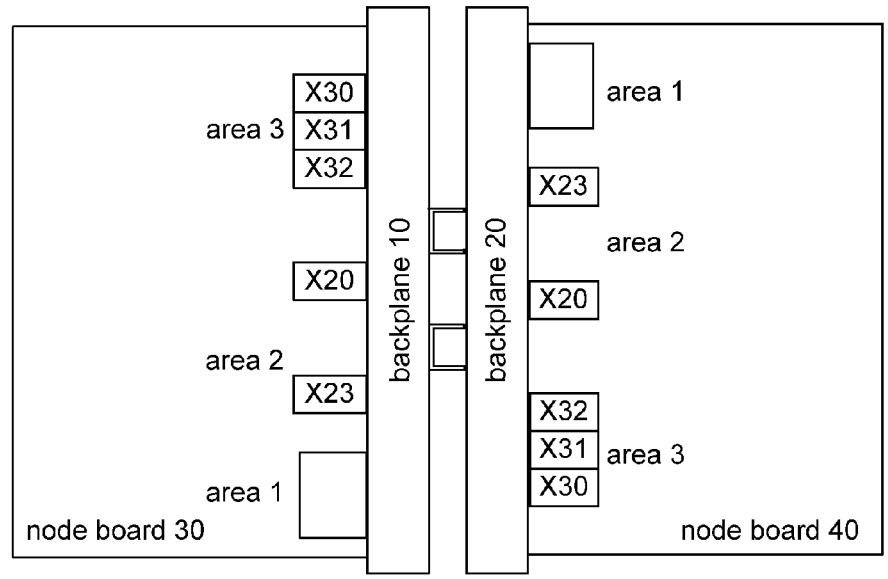
FIG. 3 is a schematic diagram of node board connection to a backplane pair according to an embodiment of the disclosure.

In FIG. 3, a backplane 10 is connected to a backplane 20 via a connector; a node board 30 connected to the backplane 10 contains an area 1, an area 2, and an area 3; a node board 40 connected to the backplane 20 contains an area 1, an area 2, and an area 3. The node board 40 may be of a type same as or different from the type of the node board 30.

A slot for the area 2 on an aforementioned node board is as defined in the PICMG3.0 specification. A slot for the area 3 on a node board is connected to the plug of a backplane, so as to be connected to one or more slots of a front backplane or a rear backplane via backplane wiring, the slots being specifically designed for providing an external or internal interface of the shelf.

Figure 4:
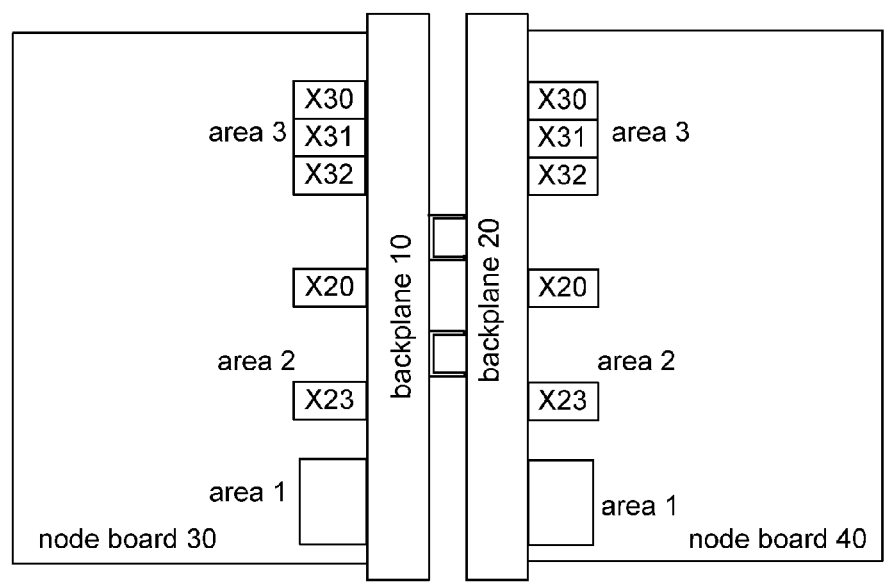
FIG. 4 is a schematic diagram of node board connection to a backplane pair according to an embodiment of the disclosure.

In FIG. 3, slots for board insertion on the front backplane are arranged asymmetric to slots for board insertion on the rear backplane. In fact, arrangement as shown in FIG. 4 may also be possible, such that slots for board insertion on the front backplane are symmetric to slots for board insertion on the rear backplane.

Figure 5:
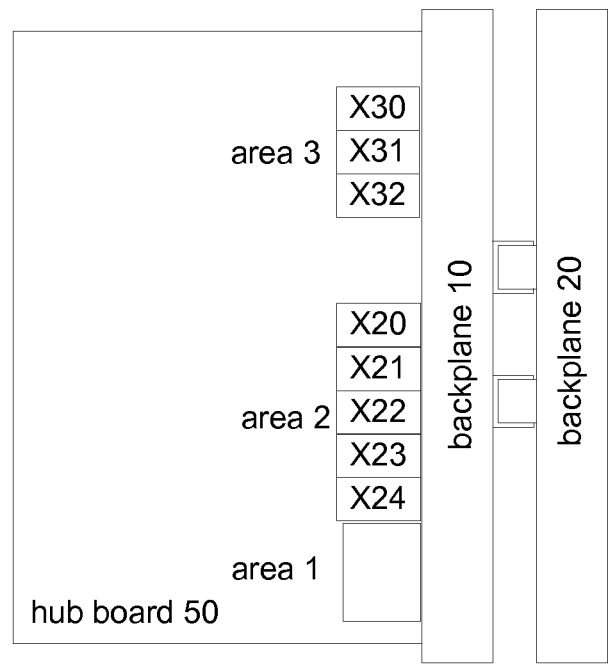
FIG. 5 is a schematic diagram of hub board connection to a backplane pair according to an embodiment of the disclosure.

In an actual application, a front backplane and/or a rear backplane in the ATCA backplane according to the disclosure may also be connected to a hub board. As shown in FIG. 5, a slot for the area 2 on a hub board 50 is as defined in the PICMG3.0 specification. A slot for the area 3 on the hub board 50 is connected to the plug of a backplane, so as to be connected to one or more slots of a front backplane or a rear backplane via backplane wiring, the slots being specifically designed for providing an external or internal interface of the shelf. In general, there may be at least two such hub boards which may be arranged on the same backplane or on two different backplanes respectively. The two hub boards may back up each other.

An aforementioned ATCA backplane, when installed in an ATCA shelf, may back up an existing function module such as a power supply module (PEM), a shelf management module (CMM), a fan module (FCM), a shelf data module (CDM), and the like.

Note that a user-defined interface is arranged in area 3 on a board, which ensures a flexible system design. A signal in the area 3 on a hub board can be extracted via a specially designed slot, which, plus arrangement of an external interface, ensures capability of shelf cascade; A signal in the area 3 on a node board can also be extracted via a specially designed slot, and an external interface remains as well.

After being manufactured separately, a front backplane and a rear backplane for installing the ATCA backplane may be connected tightly into one piece via a connector and a fastener between the backplanes. Logically the front backplane and the rear backplane connected to each other may be taken as a separate backplane with both front and rear faces having slots for board insertion. In addition, a connector between a front backplane and a rear backplane may convey a signal, electric energy and the like. There may be multiple inter-backplane connectors, and the inter-backplane connectors may be of one or more types.

It may be seen from the description that an ATCA backplane herein applies to a scenario as follow.

1) In an existing ATCA system, respective interfaces for a keyboard, a mouse, and a display are provided independently by a rear board for a node board. In actual use, it's impossible to configure a keyboard, a mouse, and a display for each rear board. Instead, an external switch for keyboard, mouse, and display sharing is arranged, which not only occupies shelf space, but also requires much wiring. With the ATCA backplane herein, a node board no longer requires a rear board. A keyboard, mouse, or display signal of area 3 on any node board may gather directly to a specially designed slot on a backplane. A board connected to the specially designed slot then serves as a switch for keyboard, mouse, and display sharing, Thus, space for the external equipment is saved, and the amount of wiring is reduced greatly, enhancing system reliability.

2) In an existing ATCA system, a shelf may accommodate 12 node boards at most. An additional shelf must be cascaded to enhance processing capability further. With the ATCA backplane herein, it is ensured that one shelf may provide 24 node boards, which not only enhances processing capability greatly, but also saves cost by saving expenses on one shelf and auxiliary functional modules such as the PEM, CMM, FCM, CDM.

In short, the ATCA backplane herein includes at least a front backplane and a rear backplane interconnected via a connector. Each backplane in the ATCA backplane contains slots for at least one node board. In addition, at least one backplane in the ATCA backplane is arranged with a slot for a hub board. Therefore, a node board may be inserted in either a front backplane or a rear backplane in the ATCA backplane herein, increasing a number of node board slots, expanding slot resources, and enhancing system processing capability.

What described are merely embodiments of the disclosure, and are not intended to limit the scope of the present disclosure.

The invention claimed is:

1. An Advanced Telecom Computing Architecture ATCA backplane to be installed in an ATCA shelf, comprising at least one backplane pair of a front backplane and a rear backplane interconnected via a connector and a fastener between the backplanes, such that the front backplane and the rear backplane connected to each other are taken as a separate backplane with both front and rear faces having slots for board insertion, wherein each backplane in the at least one backplane pair contains slots for at least one node board, wherein a board to be connected to a backplane in the at least one backplane pair comprises areas 1, 2, and 3 of interfaces; an interface for connecting the board to the backplane is defined in the area 1 or the area 2 by function; and a user-defined interface is arranged in the area 3 on the board, wherein the backplane in the at least one backplane pair extends to the area 3 on the board to which the backplane is to be connected, and is arranged with a plug to be connected to a slot for the area 3 on the board, wherein a slot for an area 3 on a node board connected to a backplane in the at least one backplane pair is connected to one or more slots of the front backplane or the rear backplane via backplane wiring, the one or more slots being for providing an external interface or internal interface of the ATCA shelf.

2. The ATCA backplane according to claim 1, wherein a node board connected to the front backplane is of a type same as or different from a type of a node board connected to the rear backplane.

3. The ATCA backplane according to claim 2, wherein at least one backplane in the ATCA backplane contains a slot for a hub board.

4. The ATCA backplane according to claim 3, wherein the slot for the hub board comprises slots for at least two hub boards.

5. The ATCA backplane according to claim 1, wherein board connecting slots of the front backplane are arranged symmetric or asymmetric to board connecting slots of the rear backplane.

6. The ATCA backplane according to claim 1, wherein the connector comprises one or more connectors; when there are multiple connectors, the multiple connectors are of one or more types.

7. The ATCA backplane according to claim 1, wherein at least one backplane in the ATCA backplane contains a slot for a hub board.

8. The ATCA backplane according to claim 7, wherein the slot for the hub board comprises slots for at least two hub boards.

9. The ATCA backplane according to claim 7, wherein the hub board comprises at least two hub boards arranged on a same backplane, or arranged respectively on two different backplanes, and the at least two hub boards back up each other.

10. The ATCA backplane according to claim 7, wherein a slot for an area 3 on a hub board connected to a backplane in the at least one backplane pair is connected to one or more specially designed slots of the front backplane or the rear backplane via backplane wiring.

* * * * *